Patented Dec. 9, 1941

2,265,181

UNITED STATES PATENT OFFICE 2,265,181

RESINOUS COMPOSITION AND METHOD OF PRODUCING

Robert W. Martin, Wilmington, Del., assignor to Hercules Powder Company, Wilmington, Del., a corporation of Delaware No Drawing. Application November 10, 1939, Serial No. 303,818

16 Claims. (Cl. 260—9)

This invention relates to a novel resinous composition and method of producing, and more particularly to a method of producing a novel resinous composition from ligneous wood and to the novel resinous composition produced.

My invention has as its object the treatment of ligneous wood in such a manner as to destroy the cellular structure of the wood and to produce a novel and very useful resinous composition.

I have discovered, in accordance with this invention, that ligneous wood which is highly resinous, or ligneous wood which is not resinous admixed with a material such as a resin acid or material containing a resin acid, may be disintegrated with formation of a novel resinous composition by heating with water under superatmospheric pressure at a temperature of about 240° C. to about 330° C., and preferably about 250° C. to about 280° C. The wood must be submerged in the water to provide the novel resin, since heating the wood in steam or air does not destroy the cellulose structure and only leaves a charred mass as the product.

I have found that the woods which operate in my process are those woods known to contain lignin. Pine wood is especially suitable, but such woods as maple, birch, basswood, etc., may also be used. Ligneous cellulosic grasses and straws which are closely related to wood such as, for example, bagasse fibre, peat moss, lignite, etc., may likewise be used and are considered as included within the term "wood" as used in this invention. The wood is preferably used in the form of small chips or as sawdust, to facilitate the penetration of the water during the treatment.

In the case of ligneous resinous woods the resin acids present in the wood provide a necessary component for the production of the novel resin. I have found that in the case of pine wood, for example, a rosin content of about 15 to about 25% by weight is desirable. Pine stump wood usually contains rosin in about this range, whereas top wood usually has a rosin content below this range. With the non-resinous ligneous woods I have found that I may impregnate such woods with a resin acid or a material containing a resin acid, and produce a similar effect to that obtained with the resinous wood. Stump pine wood or stump pine wood which has been steamed to remove the turpentine are particularly desirable. Pine wood from which turpentine and rosin have been steamed and extracted may be used by first impregnating with a resin acid such as, for example, abietic acid, wood or gum rosin, etc., or materials containing resin acids as, for example, residual resinous products obtained in the refining operations of wood rosin such as are known as rosin residue, a gasoline-insoluble pine wood resin, pine tar, commercial rosin oil, etc. To provide a desirable form of resinous composition, the wood treated in accordance with the process of the invention should contain at least about 10 per cent by weight of a resin acid or material containing a resin acid as set forth above.

In carrying out the process in accordance with this invention a ligneous, resinous wood or a ligneous wood which is not resinous but which has been impregnated with a resin acid or material containing a resin acid is heated with water, in amount sufficient to completely cover the wood, at a temperature within the range of about 240 to about 330° C. for a time sufficient to effect complete disintegration of the cellular structure of the wood. The pressure under which the heating proceeds is usually higher than the water vapor pressure at the particular temperature due to the evolution of volatile gases such as carbon dioxide in the reaction. At the higher temperatures it is desirable to vent the apparatus so as to remove some of the volatile gases formed. Generally speaking, the pressure will fall within the range of about 400 to 1900 lbs./sq. in. The time required to complete the reaction will depend on several factors such as the particular wood used and the temperature of heating. At the lower temperatures a longer heating time is required. Generally speaking, a heating time of about two minutes to about six hours will be employed. By direct injection of the hot water into a chamber containing the wood a very short reaction time will be possible. At the end of the heating period, the material is cooled, the pressure released and the resin produced separated from the water solution. The resin may then be heated to about 175° to 275° C. to expel dissolved gases, water and volatile organic material. The water layer will usually contain small amounts of acetone, acetic acid, methanol, etc., resulting from decomposition of the wood. A small amount of a soft, tarry material is also formed, which, being insoluble in the water layer, may be removed readily. It is presumably precipitated from the water layer during cooling.

The resinous composition which is obtained by carrying out the process of this invention is generally characterized by freedom from cellular matter remaining from the wood and by a relatively dark color. It will be found to be only slightly soluble in gasoline hydrocarbons but largely soluble in acetone, Cellosolve, Carbitol, and partly soluble in toluene and xylene. It will have a drop melting point generally above 100° C. and in some cases will melt as high as 250° C. It will, in general, be acidic in character.

As illustrative of the procedure for practicing my invention, for the production of my novel resinous composition, the following examples may be cited:

Example I

Seven hundred and fifty parts by weight of unsteamed pine stump chips containing 20.7% by weight of rosin and 15.6% by weight of moisture were covered with 3000 parts by weight of water in a stainless steel autoclave and heated at a pressure of approximately 1000 lbs./in².  for one hour. After cooling the autoclave and releasing the pressure, 418 parts by weight of a dark-colored resin and 3082 parts by weight of an acidic water layer were removed from the autoclave. The chips had disintegrated completely. The resin, after driving off dissolved water, had a saponification number of about 106, a drop melting-point of about 141.5° C. and was 95.5% insoluble in gasoline. It contained no carbonaceous matter and was largely soluble in acetone.

Example II

One hundred and fifty parts by weight of spent pine chips from which the turpentine, rosin and oils had been extracted were impregnated with a solution of 50 parts by weight of FF wood rosin dissolved in 200 parts by weight of acetone. The acetone was then removed by evaporation. The impregnated chips were then covered with 550 parts by weight of water in an autoclave and heated at a temperature of 250 to 270° C. for one hour. The pressure developed was 950 to 1000 lbs./in².  The resin produced was similar to that obtained in Example I.

Example III

The procedure of Example II was duplicated with the exception that the heating was carried out at 240 to 245° C. for 3 hours. A similar product resulted.

Example IV

The procedure of Example II was duplicated with the exception that a solution of 37.5 parts by weight of FF wood rosin in 200 parts by weight of acetone was used to impregnate the spent pine chips. The resinous composition obtained had an acid number of 90.

Example V

One hundred and twenty parts by weight of spent pine chips were reduced to sawdust size and impregnated with 60 parts by weight of rosin residue consisting of a molasses-like liquid obtained in the process of refining wood rosin and containing rosin acids. The rosin residue had an acid number of 57 indicating about 31% resin acid content. Impregnation was carried out by warming the chips and rosin residue until distribution in the chips appeared uniform. This material was covered with 500 parts by weight of water in an autoclave and heated at 260° C. for one hour. On opening the autoclave after cooling, a yellow aqueous layer and a solid resin having no cellular matter were obtained. The resin was similar in properties to that described in Example I and had an acid number of 92, a drop melting-point of 132.5° C. and was 97% insoluble in gasoline.

Example VI

One hundred and fifty parts by weight of spent pine chips were impregnated with 90 parts by weight of pine tar. The impregnated chips were then covered with 550 parts by weight of water in an autoclave and heated at a temperature of about 260° C. for one hour. The pressure developed was about 850 lbs./in².  A yield of 117 parts by weight of dark, hard resin was obtained.

Example VII

Eighty-six parts by weight of maple wood sawdust were impregnated with 43 parts by weight of rosin residue as in Example V. The impregnated wood was covered with 600 parts by weight of water in an autoclave and heated at 260° C. for 45 minutes. The autoclave was then cooled and opened. The yield of resin obtained was 78 parts by weight. The resin had an acid number of about 65, a saponification number of about 162 and a drop melting-point of 136.5° C.

The novel resin produced in accordance with my invention is useful in a wide variety of applications. Thus it may be used in molding compositions and plastics, as a dry core binder, in core oils and core oil emulsions, in asphalt emulsions, as a binding material for fiber building board, in dense pressed boards and in bonding insulating boards.

It will be understood that the details and examples hereinbefore set forth are illustrative only, and that the invention as herein broadly described and claimed is in no way limited thereby.

What I claim and desire to protect by Letters Patent is:

1. The method of producing a resinous composition which comprises heating a ligneous wood and a material selected from the group consisting of natural resin acids and materials containing natural resin acids with water in amount sufficient to substantially completely submerge the wood under superatmospheric pressure at a temperature within the range of about 240° C. to about 330° C. until the cellular structure of the wood has disappeared, then recovering a resin as the residue remaining after removal of the water solution.

2. The method of producing a resinous composition which comprises heating a ligneous resinous wood with water in amount sufficient to substantially completely submerge the wood under superatmospheric pressure at a temperature within the range of about 240° C. to about 330° C. until the cellular structure of the wood has disappeared, then recovering a resin as the residue remaining after removal of the water solution.

3. The method of producing a resinous composition which comprises heating a ligneous wood and a natural resin acid with water in amount sufficient to substantially completely submerge the wood under superatmospheric pressure at a temperature within the range of about 240° C. to about 330° C. until the cellular structure of the wood has disappeared, then recovering a resin as the residue remaining after removal of the water solution.

4. The method of producing a resinous composition which comprises heating a ligneous wood and a rosin acid with water in amount sufficient to substantially completely submerge the wood under superatmospheric pressure at a temperature within the range of about 240° C. to about 330° C. until the cellular structure of the wood has disappeared, then recovering a resin as the residue remaining after removal of the water solution.

5. The method of producing a resinous composition which comprises heating a ligneous wood and a material containing natural resin acids with water in amount sufficient to substantially completely submerge the wood under superatmospheric pressure at a temperature within the range of about 240° C. to about 330° C. until the cellular structure of the wood has disappeared, then recovering a resin as the residue remaining after removal of the water solution.

6. The method of producing a resinous composition which comprises heating pine wood containing about 15 to about 25 per cent by weight of rosin with water in amount sufficient to substantially completely submerge the wood under superatmospheric pressure at a temperature within the range of about 240° C. to about 330° C. until the cellular structure of the wood has disappeared, then recovering a resin as the residue remaining after removal of the water solution.

7. The method of producing a resinous composition which comprises heating pine wood from which the turpentine, rosin and oils have been extracted, and a material selected from the group consisting of natural resin acids and materials containing natural resin acids, with water in amount sufficient to substantially completely submerge the wood under superatmospheric pressure at a temperature within the range of about 240° C. to about 330° C. until the cellulose structure of the wood has disappeared, then recovering a resin as the residue remaining after removal of the water solution.

8. The method of producing a resinous composition which comprises heating pine wood from which the turpentine, rosin and oils have been extracted, and rosin with water in amount sufficient to substantially completely submerge the wood under superatmospheric pressure at a temperature within the range of about 240° C. to about 330° C. until the cellular structure of the wood has disappeared, then recovering a resin as the residue remaining after removal of the water solution.

9. The method of producing a resinous composition which comprises heating a ligneous wood and a material selected from the group consisting of natural resin acids and materials containing natural resin acids with water in amount sufficient to substantially completely submerge the wood under superatmospheric pressure at a temperature within the range of about 250° C. to about 280° C. until the cellular structure of the wood has disappeared, then recovering a resin as the residue remaining after removal of the water solution.

10. The method of producing a resinous composition which comprises heating a ligneous resinous wood with water in amount sufficient to substantially completely submerge the wood under superatmospheric pressure at a temperature within the range of about 250° C. to about 280° C. until the cellular structure of the wood has disappeared, then recovering a resin as the residue remaining after removal of the water solution.

11. As a new composition of matter, the resin produced by heating a ligneous wood and a material selected from the group consisting of natural resin acids and materials containing natural resin acids with water in amount sufficient to substantially completely submerge the wood under superatmospheric pressure at a temperature within the range of about 240° C. to about 330° C. until the cellular structure of the wood has disappeared and recovering a resin as the residue remaining after removal of the water solution.

12. As a new composition of matter, the resin produced by heating a ligneous resinous wood with water in amount sufficient to substantially completely submerge the wood under superatmospheric pressure at a temperature within the range of about 240° C. to about 330° C. until the cellular structure of the wood has disappeared and recovering a resin as the residue remaining after removal of the water solution.

13. As a new composition of matter, the resin produced by heating a ligneous wood and a natural resin acid with water in amount sufficient to substantially completely submerge the wood under superatmospheric pressure at a temperature within the range of about 240° C. to about 330° C. until the cellular structure of the wood has disappeared and recovering a resin as the residue remaining after removal of the water solution.

14. As a new composition of matter, the resin produced by heating a ligneous wood and a material containing natural resin acids with water in amount sufficient to substantially completely submerge the wood under superatmospheric pressure at a temperature within the range of about 240° C. to about 330° C until the cellular structure of the wood has disappeared and recovering a resin as the residue remaining after removal of the water solution.

15. As a new composition of matter, the resin produced by heating pine wood containing about 15 to about 25 per cent by weight of rosin with water in amount sufficient to substantially completely submerge the wood under superatmospheric pressure at a temperature within the range of about 240° C. to about 330° C. until the cellular structure of the wood has disappeared and recovering a resin as the residue remaining after removal of the water solution.

16. As a new composition of matter, the resin produced by heating pine wood from which the turpentine, rosin and oils have been extracted, and a material selected from the group consisting of natural resin acids and materials containing natural resin acids with water in amount sufficient to substantially completely submerge the wood under superatmospheric pressure at a temperature within the range of about 240° C. to about 330° C. until the cellular structure of the wood has disappeared and recovering a resin as the residue remaining after removal of the water solution.

ROBERT W. MARTIN.

CERTIFICATE OF CORRECTION.

Patent No. 2,265,181. December 9, 1941.

ROBERT W. MARTIN.

It is hereby certified that error appears in the printed specification of the above numbered patent requiring correction as follows: Page 3, first column, line 34, claim 7, for "cellulose" read --cellular--; and that the said Letters Patent should be read with this correction therein that the same may conform to the record of the case in the Patent Office.

Signed and sealed this 20th day of January, A. D. 1942.

(Seal)

Henry Van Arsdale,
Acting Commissioner of Patents.

CERTIFICATE OF CORRECTION.

Patent No. 2,265,181. December 9, 1941.

ROBERT W. MARTIN.

It is hereby certified that error appears in the printed specification of the above numbered patent requiring correction as follows: Page 3, first column, line 34, claim 7, for "cellulose" read --cellular--; and that the said Letters Patent should be read with this correction therein that the same may conform to the record of the case in the Patent Office.

Signed and sealed this 20th day of January, A. D. 1942.

(Seal)

Henry Van Arsdale,
Acting Commissioner of Patents.